US010877143B2

(12) United States Patent
Runge et al.

(10) Patent No.: US 10,877,143 B2
(45) Date of Patent: Dec. 29, 2020

(54) METHOD AND DEVICE FOR GEO-REFERENCING AERIAL IMAGE DATA WITH THE AID OF SAR IMAGE DATA (71) Applicant: Deutsches Zentrum für Luft- und Raumfahrt e.V., Cologne (DE)

(72) Inventors: Hartmut Runge, Munich (DE); Thomas Krauss, Schwabmünchen (DE)

(73) Assignee: Deutsches Zentrum für Luft- und Raumfahrt e. V., Cologne (DE)

( * ) Notice: Subject to any disclaimer, the term of this patent is extended or adjusted under 35 U.S.C. 154(b) by 23 days.

(21) Appl. No.: 16/465,312

(22) PCT Filed: Nov. 29, 2017

(86) PCT No.: PCT/EP2017/080782
§ 371 (c)(1),
(2) Date: May 30, 2019

(87) PCT Pub. No.: WO2018/099949
PCT Pub. Date: Jun. 7, 2018

(65) Prior Publication Data
US 2019/0391255 A1 Dec. 26, 2019

(30) Foreign Application Priority Data
Dec. 1, 2016 (DE) .................. 10 2016 123 286

(51) Int. Cl.
*G06T 7/33* (2017.01)
*G01S 13/86* (2006.01)
*G01S 13/90* (2006.01)

(52) U.S. Cl.
CPC ............ *G01S 13/867* (2013.01); *G01S 13/90* (2013.01); *G06T 7/33* (2017.01); *G06T 2207/10032* (2013.01); *G06T 2207/10044* (2013.01)

(58) Field of Classification Search
CPC ......... G01S 13/867; G01S 13/90; G06T 7/33; G06T 2207/10032; G06T 2207/10044; G01C 11/06
See application file for complete search history.

(56) References Cited

U.S. PATENT DOCUMENTS

2012/0127028 A1 5/2012 Bamler et al.
2015/0324989 A1* 11/2015 Smith .................. G06T 7/33
382/278

FOREIGN PATENT DOCUMENTS

WO WO 2010/057903 A1 5/2010

OTHER PUBLICATIONS

Prasath, VB Surya, and Oussama Haddad. "Radar shadow detection in synthetic aperture radar images using digital elevation model and projections." Journal of Applied Remote Sensing 8, No. 1 (2014): 083628. (Year: 2014).*

(Continued)

*Primary Examiner* — Carol Wang
(74) *Attorney, Agent, or Firm* — Hoffmann & Baron, LLP (57) ABSTRACT

A method and device for geo-referencing of supplied aerial image data, which has been recorded by an imaging system and in which a part of the earth's surface is imaged, wherein the geo-referencing of the aerial image data is carried out based on the supplied geo-referenced synthetic aperture radar (SAR) image data, in which the same part of the earth's surface is imaged, wherein the method and system include: determination of essentially point-like radar signatures RS in the geo-referenced SAR image data, provision of a position of the sun for recording time of the aerial image data and the part of the earth's surface imaged therein, determination of elongated cast shadows SS produced in a direction of solar radiation in the aerial image data based on the position of the sun at the time of recording, determination in the aerial image data of initial points AP facing the (Continued)

sun of the determined cast shadows SS, determination of spatially corresponding point-like radar signatures RS and the initial points AP of the cast shadows SS, registration of the aerial image data with the SAR image data based on the corresponding radar signatures RS and the initial points AP, and transfer of the geo-referencing of the SAR image data to the aerial image data registered with the SAR image data.

16 Claims, 3 Drawing Sheets

(56) References Cited

OTHER PUBLICATIONS

Wessel, B., M. Huber, and A. Roth. "Registration of near real-time SAR images by image-to-image matching." PIA07 (2007): 179. (Year: 2007).*

English translation of the International Preliminary Report on Patentability issued in International Application No. PCT/EP2017/080782 dated Jun. 13, 2019.

* cited by examiner

METHOD AND DEVICE FOR GEO-REFERENCING AERIAL IMAGE DATA WITH THE AID OF SAR IMAGE DATA

CROSS-REFERENCE TO RELATED APPLICATIONS

This application is the U.S. National Phase of, and Applicant claims priority from, International Application No. PCT/EP2017/080782, filed on 29 Nov. 2017, and German Patent Application No. DE 10 2016 123 286.6, filed on 1 Dec. 2016, both of which are incorporated herein by reference in their entirety.

BACKGROUND

Field

The invention relates to methods and devices for geo-referencing of aerial image data. The invention further relates to a computer system, a digital storage medium, a computer program product, and a computer program.

Related Art

The problem which the present invention proposes to solve is to indicate an improved method and an improved device for the geo-referencing of aerial image data.

SUMMARY

By the term "aerial image data" is meant in the present disclosure image data that has been detected by a carrier situated in the atmosphere or moving there, or by a satellite using a recording system, especially by an optical recording/imaging system.

By the term "geo-referencing" is meant in the present disclosure the assigning of coordinate-related information to the respective image data (pixels). The coordinate-related information pertains in particular to geo-coordinates.

The invention will emerge from the features of the independent claims. Advantageous modifications and embodiments are the subject matter of the dependent claims. Further features, application possibilities, and benefits of the invention will emerge from the following specification, as well as the discussion of example embodiments of the invention as represented in the figures.

A first aspect of the invention relates to a method for geo-referencing of supplied aerial image data, which has been recorded by an imaging system and in which a part of the earth's surface is imaged, wherein a geo-referencing of the aerial image data is carried out on the basis of supplied geo-referenced SAR image data, in which the same part of the earth's surface is imaged.

The optical imaging system preferably includes a camera, and/or a video camera, and/or a stereo camera, and/or a 3D camera, and/or a laser scanning system, etc., wherein the imaging system preferably enables a recording of the earth's surface in the optically visible range, or in the adjacent frequency ranges.

By the term "SAR image data" is meant in the present disclosure image data that has been recorded with a radar having a synthetic aperture ("Synthetic Aperture Radar"). Radar systems for the generating of the SAR image data are used in the present case aboard aircraft, dirigibles, balloons, drones, or satellites; they scan the earth's surface with electromagnetic waves and enable a two-dimensional or three-dimensional representation of the detected segment of the earth's surface. The supplied SAR image data is already geo-referenced. This is done with a method known in the prior art. These methods enable a geo-referencing accuracy in the range of a few centimeters, especially of 1 cm-10 cm, or 1 cm-5 cm, or 5 cm-10 cm, or 10 cm-50 cm.

Advantageously, the aerial image data and the geo-referenced SAR image data is present each time as ortho-rectified image data. Advantageously, the aerial image data is already at least roughly geo-referenced.

Advantageously, the aerial image data is recorded with an optical sensor system, or a radar sensor system, or some other imaging sensor system situated on board an aircraft, a drone, or a satellite. Advantageously, SAR image data is recorded with a SAR system situated on board an aircraft or a satellite.

The proposed method according to a first alternative involves the following steps. In one step, a determination of essentially point-like radar signatures RS is done in the geo-referenced SAR image data. Advantageously, use is made of the fact that base points of elongated, mast-like objects standing on the earth's surface (such as the poles of street lamps, traffic signs, power lines, etc.) act as corner reflectors and thus are represented in the supplied SAR image data as essentially point-like objects, whose position can be determined with a geo-referencing accuracy in the range of a few centimeters.

In a further step, the provision of the position of the sun for the recording time of the aerial image data and the part of the earth's surface imaged therein is done. The position of the sun can be provided for example as the angle of elevation and azimuth for a central point of the particular segment of the earth's surface being viewed or for a plurality of points on the particular segment of the earth's surface being viewed. Of course, the position of the sun can also be provided in an earth coordinate system, or in ecliptic coordinates/equatorial coordinates of the sun, or in another suitable coordinate system.

In a further step, a determination of elongated, in particular line or bar-shaped cast shadows SS produced in the direction of the solar radiation and generated by elongated mast-like objects rising vertically from the earth's surface is done in the aerial image data based on the position of the sun at the time of recording. Since at the time of recording time of the aerial image data the position of the sun and thus the direction of the solar radiation on the imaged earth's surface is known, elongated, in particular line or bar-shaped cast shadows SS which are oriented in the direction of the solar radiation can be determined in the aerial image data. Cast shadows SS are typically imaged darker than the area surrounding the shadows.

In a further step, a determination in the aerial image data of initial points AP facing the sun of the determined cast shadows SS is done. The term "initial points AP" may include several pixels. It is assumed that the cast shadow produced by a mast-like object standing on the earth's surface extends up to the "base point" of the object, where the "base point" of the object is the region with which the object adjoins the earth's surface.

In a further step, a determination of spatially corresponding point-like radar signatures RS and initial points AP of the cast shadows SS is done. The starting point here is the set $\{RS_i\}$ of the radar signatures RS and the set $\{AP_n\}$ of the initial points AP. In order to find corresponding pairs of points, first of all the point from the set $\{AP_n\}$ situated closest to each point of the set $\{RS_i\}$ is coordinated with it. Furthermore, advantageously, a threshold value is defined, which decides how large the distance may be between the resulting pairs of points so that they are still considered to be corresponding points. There are various algorithms, with differing complexity, for the finding of such corresponding pairs of points.

In a further step, a registration of the aerial image data with the SAR image data is done on the basis of the corresponding radar signatures RS and initial points AP. In a further step, a transfer of the geo-referencing of the SAR image data to the aerial image data registered with the SAR image data is done. Thus, the registration of the aerial image data with the SAR image data is done at first in point-like manner, wherein corresponding radar signatures RS and initial points AP are registered with each other, and then advantageously a geo-referencing is assigned to every further pixel of the aerial image data.

The proposed method is therefore based on the determination, in the aerial image data, of the optical base points of mast-like objects extending vertically from the earth's surface, and the registration of these base points with corresponding point-like radar objects of the SAR image data. The determination of the base points in the aerial image data is done according to the invention by at first determining imaged cast shadows lying in the direction of the sun, having a line or mast-like shape, and then by determining the end of the particular cast shadow facing the sun. Under the assumption that the cast shadows proceed each time from the base point of the line or mast-like object standing vertically on the earth's surface, the end of the particular cast shadow facing the sun establishes the respective base point in the aerial image data. As already explained above, the base point in the SAR image data is reflected by essentially point-like represented radar objects. This is based on the fact that a line or mast-like object extending vertically from the earth's surface forms an almost right angle at the base with the earth's surface, which acts as a corner reflector.

Advantageously, mast-like objects with rotational symmetry are suitable for this. Such masts are imaged in the SAR image data as essentially sharp points, while the phase center of their back-scattering lies exactly in the base point of the mast (facing the sensor). Thanks to its rotational symmetry, there is no dependency on the radar angle of incidence or the aspect angle. Furthermore, the masts generally appear very bright in the radar image, since due to the corner reflector effect resulting from the double reflection of the waves with the ground in front of the mast, practically the entire back-scattered energy of the mast is focused in the base point of the mast.

In the aerial image data, the masts can be recognized by their elongated extension and their cast shadows. Often, in addition to the cast shadow SS, the mast generating the cast shadow is itself visible, so that a V-shaped structure results, which can be determined in the aerial image data. In the aerial image data, during the time of recording the position from which the recording was done is also typically known to within a few meters, advantageously to within a few centimeters. From this, the sun's angles of elevation and azimuth are easily calculated. If the precise recording time is not known, in an initial processing step it is possible to determine the position of the sun at the recording time and at the place of recording of the aerial image or the aerial image data. This can be determined by looking for cast shadows in the aerial image data, which appear as black lines with a particular direction. This can be facilitated, for example, by using a Hough transformation or suitable Gabor filter. It may also be advantageous to invert the aerial image data, so that the dark or black lines of the cast shadows turn into white or bright lines, which might be more easily identifiable.

Since the coordinates of the radar control points (of the point-like radar signatures RS) are known and advantageously the aerial image data is likewise at least roughly geo-referenced, the search zone in the aerial image data can be limited to predetermined surroundings of the radar signatures. The point-like radar signatures RS may also be used for the registration of two radar images, which were recorded at a different angle (for example, for radargrammetry), or one radar image and one optical image, for example.

The method is suitable for automatic execution, in which suitable control points (homologous points or mutually corresponding points, such as RS, AP) are used for the registration/matching between aerial image data and radar data or between radar data and radar data.

A further aspect of the invention relates to a method for geo-referencing of supplied aerial image data, which has been recorded by an (optical) imaging system and in which a part of the earth's surface is imaged, wherein a geo-referencing of the aerial image data is carried out on the basis of supplied geo-referenced SAR image data, in which the same part of the earth's surface is imaged.

The method according to a second alternative involves the following steps. In one step, a determination of essentially point-like radar signatures RS in the geo-referenced SAR image data is done. In a further step, a provision of the position of the sun (such as the azimuth/elevation) for the recording time of the aerial image data and the part of the earth's surface imaged therein is done. In a further step, on the basis of a given imaging geometry of the imaging system and a supplied position of the imaging system during the recording of the aerial image data, a determination of elongated, especially line or bar-shaped projection images PB of elongated, mast-like objects rising vertically above the earth's surface in the aerial image data is done. In this step, therefore, a search is made for images of mast-like objects in the aerial image data, the direction in which mast-like elongated objects are imaged in the aerial image data being known on account of the known imaging geometry.

In a further step, a determination of elongated, in particular line or bar-shaped cast shadows SS produced in the direction of the solar radiation and generated by elongated mast-like objects rising vertically above the earth's surface in the aerial image data is done, based on the position of the sun at the time of recording.

In a further step, a determination of intersecting points SP of spatially corresponding cast shadows SS and projection images PB and/or of their respective prolongations each time in the longitudinal direction is done. The assumption that a cast shadow of a mast-like object extending vertically from the earth's surface begins at its base point, or that the base point of a mast-like object extending vertically from the earth's surface is recognizable in the aerial image data, is not always granted. Thus, the base point or a first portion of the mast-like object extending above the earth's surface may be concealed by green vegetation, for example, or the cast shadow may lie in a region which is also imaged dark, so that the cast shadow is not recognizable as such. In these cases, each time a V-shaped intersecting point SP between cast shadow and the object producing the cast shadow in the aerial image data is determined. This intersecting point SP corresponds to the base point of the mast-like object extending vertically from the earth's surface in the aerial image data.

In a further step, a determination of spatially corresponding point-like radar signatures RS and intersecting points SP is done. In a further step, a registration of the aerial image data with the SAR image data is done on the basis of the corresponding radar signatures RS and intersecting points SP. In a further step, a transfer of the geo-referencing of the SAR image data to the aerial image data registered with the SAR image data is done.

This method of the second alternative thus differs from the first described method of the first alternative in that the base points of mast-like objects extending vertically above the earth's surface are determined as intersecting points of cast shadows and the imaged mast-like objects themselves. Advantageously, the prolongation of the longitudinal axes of the respective cast shadow or the mast-like imaged object in order to generate an intersecting point SP will be chosen each time only smaller than a predetermined threshold value G1. Advantageously, the mast-like objects intersect the corresponding cast shadow in the aerial image at an angle between 45° and 135°.

In one advantageous modification of the proposed method, the methods according to the first alternative and second alternative are carried out in succession for instances in which the method according to the first alternative was not able to determine a sufficient number of corresponding points RS and AP. In this case, the method according to the second alternative is carried out for the points RS and AP not yet identified as being corresponding points.

One advantageous modification of the proposed method according to the first alternative or the second alternative is characterized in that the supplied aerial image data already includes at least a rough geo-referencing with a geo-referencing accuracy $G_L[m]$, and the supplied geo-referenced SAR image data includes a geo-referencing accuracy $G_{SAR}[m]$, wherein: $G_{SAR}[m] < G_L[m]$.er One advantageous modification of the proposed method according to the first alternative or the second alternative is characterized in that the point-like radar signatures of image radar objects extend substantially vertically from the earth's surface and are for example masts, poles, or beams.

One advantageous modification of the proposed method according to the first alternative or the second alternative is characterized in that the radar objects are rotationally symmetrical.

One advantageous modification of the proposed method according to the first alternative or the second alternative is characterized in that the supplied geo-referenced SAR image data has a geo-referencing accuracy $G_{SAR}$ of $\leq 0.5$ m, in particular $\leq 5$ cm, $\leq 10$ cm, $\leq 20$ cm, $\leq 30$ cm, or $\leq 40$ cm.

One advantageous modification of the proposed method according to the first alternative or the second alternative is characterized in that the supplied aerial image data is geo-referenced and has a geo-referencing accuracy $G_{aerial}$ of $\leq 150$ m, especially $\leq 100$ m, $\leq 50$ m, $\leq 20$ m, or $\leq 10$ m.

One advantageous modification of the proposed method according to the first alternative or the second alternative is characterized in that in the SAR image data only those essentially point-like radar signatures are determined for which no other radar signatures are present in an image data periphery with a given radius R about a center of the respective radar signature.

One advantageous modification of the proposed method according to the first alternative or the second alternative is characterized in that the radius R is chosen depending on the geo-referencing accuracy $G_{aerial}$ of the supplied aerial image data: $R=R(G_L)$.

One advantageous modification of the proposed method according to the first alternative or the second alternative is characterized in that the supplied aerial image data and the supplied SAR image data are respectively 3D-image data.

One advantageous modification of the proposed method according to the first alternative or the second alternative is characterized in that the geo-referenced aerial image data is registered with a digital road map of the part of the earth's surface, and the geo-referencing of the aerial image data is transferred to the digital road map.

A further aspect of the present invention relates to a device for geo-referencing of supplied aerial image data, which has been recorded by an (optical) imaging system and in which a part of the earth's surface is imaged, wherein a geo-referencing of the aerial image data is carried out on the basis of supplied geo-referenced SAR image data, in which the same part of the earth's surface is imaged. The proposed device includes a first evaluating unit, with which essentially point-like radar signatures RS are determined in the geo-referenced SAR image data, a first interface at which the position of the sun (such as the azimuth/elevation) is provided for the recording time of the aerial image data and for the part of the earth's surface imaged therein, a second evaluating unit, with which elongated, in particular line or bar-shaped cast shadows SS produced in the direction of the solar radiation are determined in the aerial image data based on the position of the sun at the time of recording (being produced by elongated mast-like objects rising vertically above the earth's surface), a third evaluating unit, with which initial points AP facing the sun of the determined cast shadows SS are determined in the aerial image data, a fourth evaluating unit, with which spatially corresponding point-like radar signatures RS and initial points AP of the cast shadows SS are determined, a registering unit, with which the aerial image data with the SAR image data is registered on the basis of the corresponding radar signatures RS and initial points AP, and a geo-referencing unit, with which the geo-referencing of the SAR image data is transferred to the aerial image data registered with the SAR image data.

Benefits and advantageous modifications of the proposed device will emerge by analogous and appropriate transferring of the preceding remarks on the method according to the first alternative.

The invention furthermore relates to a device for geo-referencing of supplied aerial image data, which has been recorded by an (optical) imaging system and in which a part of the earth's surface is imaged, wherein a geo-referencing of the aerial image data is carried out on the basis of supplied geo-referenced SAR image data, in which the same part of the earth's surface is imaged.

The proposed device includes a first evaluating unit, with which essentially point-like radar signatures RS are determined in the geo-referenced SAR image data, a first interface at which the position of the sun (such as the azimuth/elevation) is provided for the recording time of the aerial image data and for the part of the earth's surface imaged therein, a second evaluating unit, with which elongated, in particular line or bar-shaped cast shadows SS produced in the direction of the solar radiation and which are produced by elongated, mast-like objects rising vertically above the earth's surface are determined in the aerial image data based on the position of the sun at the time of recording, a fifth evaluating unit, with which elongated, especially line or bar-shaped projection images PB of elongated, mast-like objects rising vertically above the earth's surface are determined in the aerial image data on the basis of a given imaging geometry of the optical imaging system and a supplied position of the imaging system during the recording of the aerial image data, a sixth evaluating unit, with which intersecting points SP of spatially corresponding cast shadows SS and projection images PB and/or of their respective prolongations each time in the longitudinal direction (of the cast shadows SS and projection images PB) are determined, a seventh evaluating unit, with which spatially corresponding point-like radar signatures RS and intersecting points SP are determined, a registering unit, with which the aerial image data with the SAR image data is registered on the basis of the corresponding radar signatures RS and intersecting points SP, a geo-referencing unit, with which the geo-referencing of the SAR image data is transferred to the aerial image data registered with the SAR image data.

Benefits and advantageous modifications of this device will emerge by analogous and appropriate transferring of the remarks made in connection with the method according to the second alternative.

The invention furthermore relates to a computer system, with a data processing device, wherein the data processing device is designed so that a method according to the first alternative or the second alternative, as described above, is carried out on the data processing device. The invention in particular relates to a co-registration processor, which is designed so that a method according to the first alternative or the second alternative, as described above, can be carried out on the co-registration processor.

The invention furthermore relates to a digital storage medium with electronically readable control signals, wherein the control signals can interact with a programmable computer system such that a method according to the first alternative or the second alternative, as described above, is carried out.

The invention furthermore relates to a computer program product with program code stored on a machine-readable medium to carry out the method according to the first alternative or the second alternative, as described above, when the program code is executed on a data processing device.

Finally, the invention relates to a computer program with program codes for carrying out the method according to the first alternative or the second alternative, as described above, when the program is running on a data processing device. For this, the data processing device may be designed as any computer system known in the prior art.

Further benefits, features and details will emerge from the following specification, in which at least one example embodiment is described in detail—with reference to the drawings if necessary. The same, similar, and/or functionally identical parts are given the same reference numbers.

DETAILED DESCRIPTION

Figure 1:
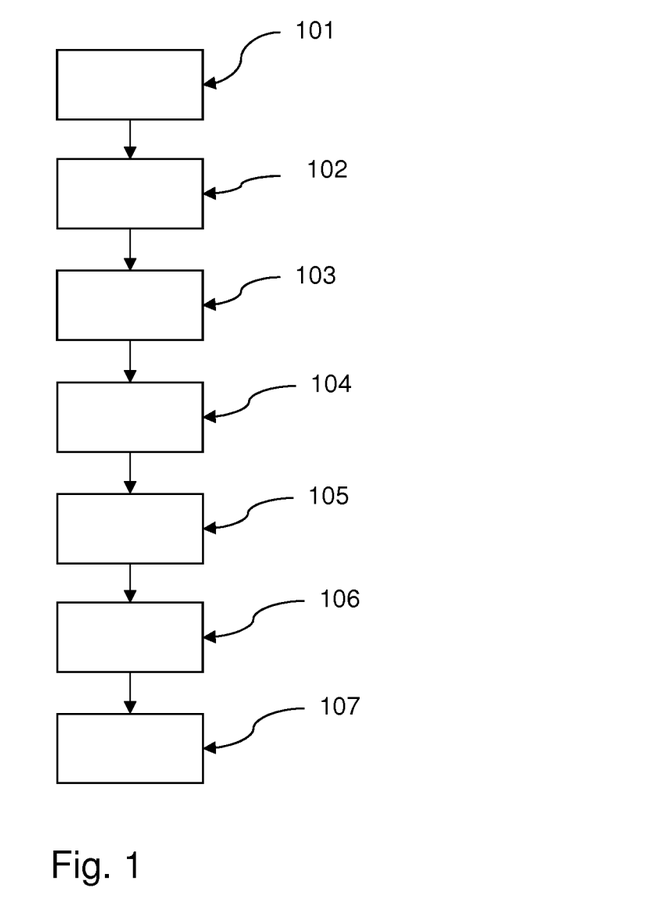
FIG. 1 shows a schematized flowchart of a proposed method according to the first alternative.

FIG. 1 shows a schematized flowchart of a proposed method for the geo-referencing of supplied aerial image data, which has been recorded by an imaging system and in which a part of the earth's surface is imaged, wherein a geo-referencing of the aerial image data is carried out on the basis of supplied geo-referenced SAR image data, in which the same part of the earth's surface is imaged. The method includes the following steps. In a step 101 a determination of essentially point-like radar signatures RS in the geo-referenced SAR image data is done. In a step 102, a provision of the position of the sun for the recording time of the aerial image data and the part of the earth's surface imaged therein is done. In a step 103, a determination of elongated, in particular line or bar-shaped cast shadows SS produced in the direction of the solar radiation in the aerial image data is done, based on the position of the sun at the time of recording. In a step 104, a determination in the aerial image data of initial points AP facing the sun of the determined cast shadows SS is done. In a step 105, a determination of spatially corresponding point-like radar signatures RS and initial points AP of the cast shadows SS is done. In a step 106, a registration of the aerial image data with the SAR image data is done on the basis of the corresponding radar signatures RS and initial points AP. In a step 107, a transfer of the geo-referencing of the SAR image data to the aerial image data registered with the SAR image data is done.

In the mentioned example embodiment, the aerial image data represents optical recordings of the earth's surface by an aerial image camera. Alternatively, the aerial image data may also be recorded with a radar sensor, a laser sensor, a lidar sensor, or another imaging sensor.

Figure 2:
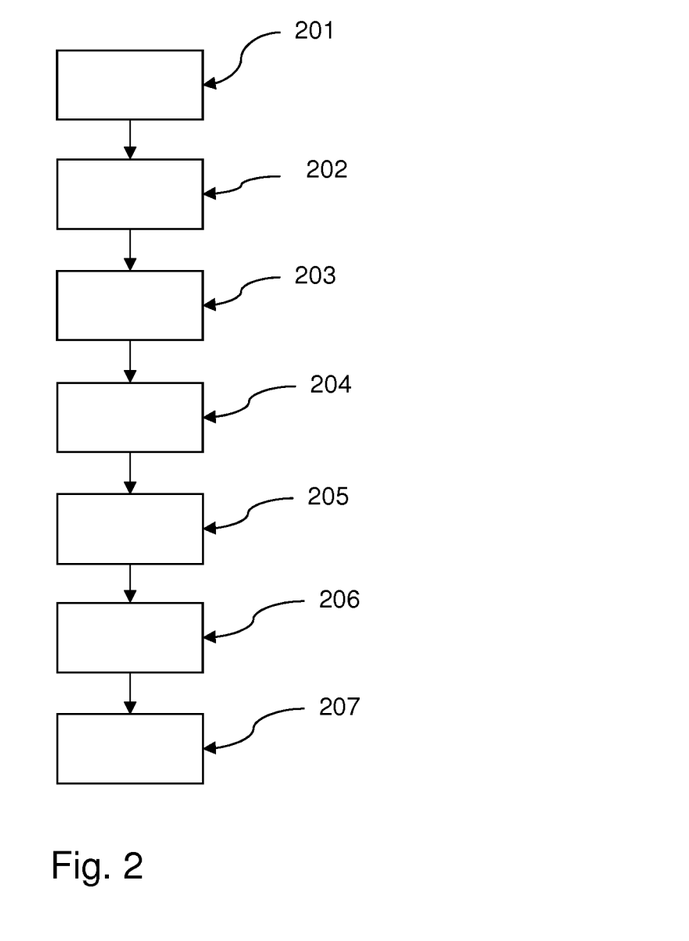
FIG. 2 shows a schematized representation of the layout of a proposed device.

FIG. 2 shows a schematized representation of the layout of a proposed device for the geo-referencing of supplied aerial image data, which has been recorded by an optical imaging system and in which a part of the earth's surface is imaged, wherein a geo-referencing of the aerial image data is carried out on the basis of supplied geo-referenced SAR image data, in which the same part of the earth's surface is imaged. The device includes the following units: a first evaluating unit 201, with which essentially point-like radar signatures RS are determined in the geo-referenced SAR image data, a first interface 202 at which the position of the sun is provided for the recording time of the aerial image data and for the part of the earth's surface imaged therein, a second evaluating unit 203, with which elongated, in particular line or bar-shaped cast shadows SS produced in the direction of the solar radiation are determined in the aerial image data based on the position of the sun at the time of recording, a third evaluating unit 204, with which initial points AP facing the sun of the determined cast shadows SS are determined in the aerial image data, a fourth evaluating unit 205, with which spatially corresponding point-like radar signatures RS and initial points AP of the cast shadows SS are determined, a registering unit 206, with which the aerial image data with the SAR image data is registered on the basis of the corresponding radar signatures RS and initial points AP, and a geo-referencing unit 207, with which the geo-referencing of the SAR image data is transferred to the aerial image data registered with the SAR image data.

Figure 3A:
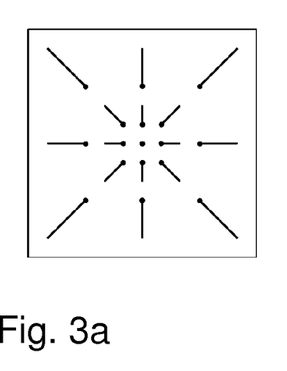
FIG. 3*a* shows as an example how masts extending vertically from the earth's surface are imaged in an aerial image taken vertically from above (=aerial image data)
Figure 3B:
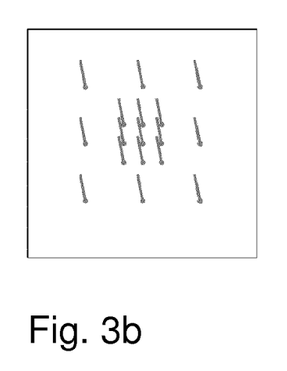
FIG. 3*b* shows as an example how cast shadows of the masts of FIG. 3*a* are imaged in the direction of the solar radiation in the aerial image data.
Figure 3C:
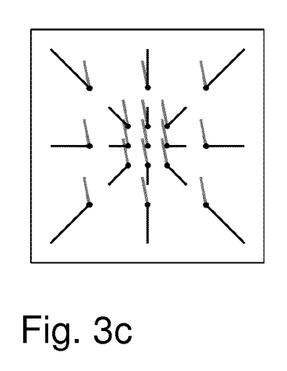
FIG. 3*c* shows as an example how intersecting points result from the cast shadows and the masts producing the cast shadows.

FIGS. 3a-3c show as examples how masts and their corresponding cast shadows are imaged in an aerial image (nadir recording) taken vertically from above. The imaging geometry of the imaging system for the recording of the aerial image data is known here. FIG. 3a shows an example for the imaging of masts standing vertically on the earth's surface in an aerial image looking vertically downward (the base points of the mast are indicated). FIG. 3b shows an example of the cast shadows of the masts standing vertically on the earth's surface of FIG. 3a, as imaged in the aerial image. FIG. 3c shows a superpositioning of masts (FIG. 3a) and cast shadows (FIG. 3b) in the aerial image.

The base points of the masts are normally not directly visible, since they are often concealed by vegetation. Therefore, it is advantageous to find the mast base point by the mutual intersecting point of the mast image (prolonged in the longitudinal direction) and the corresponding cast shadow (prolonged in the longitudinal direction).

Advantageously, the masts in the aerial image make an angle with their cast shadows between 45° and 135°, in order to allow the determination of the intersecting point with maximum tolerated error. A preferably used aerial image camera enables various configurations:

installed in the flight direction: "left" camera looking forward with an off-nadir angle between 30° and 55°, "nadir" camera looking downward and "right" camera looking rearward likewise with an off-nadir angle between 30° and 55°;

installed transversely to the flight direction: "left" camera looking to the left with an off-nadir angle between 30° and 55°, "nadir" camera looking downward and "right" camera looking to the right likewise with an off-nadir angle between 30° and 55°; or     lowered transversely to the flight direction: "left" camera looking to the left with an off-nadir angle between around 0°-5° to 20°-25°, "right" camera looking to the right with an off-nadir angle between of around 0°-5° to 20°-25°, the two cameras have a slight overlap at nadir.

Moreover, in order to compute an altitude model, the images of the nadir camera require an overlap in the flight direction of around 80% and the strips of the nadir images require an overlap of 20% between each other (i.e., transversely to the flight direction). The overlap in the flight direction of 80% requires a high image resolution frequency, which might no longer be achieved at too low a flight altitude (less than 500 m above ground). Likewise, the installation in the flight direction requires too many strips, on account of the required overlap. Altitude models can only be derived from nadir images or images with relatively small off-nadir angles of up to around 25°. Therefore, for the pure aerial survey to determine (terrain) altitude models, the lowered configuration is preferred, since in this case strips twice as broad can be recorded at once. However, studies have shown that the left/right images in the lowered configuration are not suitable for the detection of masts in the images, since these are looking too much at nadir and cannot be extracted.

For the die aerial surveys to record aerial image data, the following boundary conditions are preferable, for example (all time indications are in winter time):

installation of the 3K camera system transversely to the flight direction.

maximum raised side-looking camera images (30°-55°), which are to be used for the detection of masts, should ideally have an off-nadir angle of 40°±10°. When the off-nadir angle is too large, the image resolution is worse; when it is too small, the image of the mast is too short to be detected.

flight time if possible not too early or too late—ideally 2 hours around midday—in order to avoid too long shadows in the images, which might conceal the masts and mast shadows.

flight direction in the shadow direction (in a transverse installation) or at most ±45° slanting to the shadow direction. Thus, for a given flight direction, the flight time from the shadow direction (=flight direction) will be ±3 hours. For the resulting flight times, those closer to midday should be chosen on account of the shorter shadows.

The nadir camera should cover the entire region, in order to construct a terrain altitude model. For this, an overlap in the flight direction of 80% and between the strips (transverse to the flight direction) of 20% is necessary.

Each nadir image must additionally be covered by at least one of the side-looking images in order to detect potential masts therein. But this should always be the case for parallel strips—here, all nadir images are covered by two side-looking images, except for those of the first and last strip.

The spatial resolution of the aerial images (=aerial image data) should not be much worse than 10 cm, since midlines and side strips need to be detected in addition to the masts. This corresponds to a flight altitude of 600 m above ground.

Although the invention has been illustrated and explained in detail by preferred example embodiments, the invention is not limited by the disclosed examples and other variations may be derived from them by the person skilled in the art, without leaving the scope of protection of the invention. It is therefore clear that many variation possibilities exist. It is likewise clear that embodiments mentioned as examples indeed represent only examples which should not in any way be interpreted as limiting the scope of protection, the application possibilities, or the configuration of the invention. Instead, the preceding specification and the description of the figures will make it possible for the skilled person to concretely implement the example embodiments, wherein the skilled person having knowledge of the disclosed idea of the invention can undertake numerous changes for example in regard to the function or the arrangement of individual elements, mentioned in an example embodiment, without leaving the protection scope as defined by the claims and their legal correspondences, such as further discussion in the specification.

LIST OF REFERENCE SYMBOLS

101-111 Method steps
201 First evaluating unit
202 First interface
203 Second evaluating unit
204 Third evaluating unit
205 Fourth evaluating unit
206 Registering unit
207 Geo-referencing unit

The invention claimed is:

1. A method of geo-referencing supplied aerial image data, which has been recorded by an imaging system and in which a part of the earth's surface is imaged, wherein the geo-referencing of the supplied aerial image data is carried out based on supplied geo-referenced synthetic aperture radar (SAR) image data, in which the same part of the earth's surface is imaged, the method comprising:

determining point-like radar signatures RS in the geo-referenced SAR image data;

providing a position of the sun for recording a time of the supplied aerial image data and the part of the earth's surface imaged therein;

determining elongated cast shadows SS produced in a direction of solar radiation in the supplied aerial image data based on the position of the sun at the time as recorded;

determining, in the supplied aerial image data, initial points AP facing the sun of the determined elongated cast shadows SS;

determining spatially corresponding point-like radar signatures RS and the initial points AP of the elongated cast shadows SS;

registering the supplied aerial image data with the supplied geo-referenced SAR image data based on the spatially corresponding point-like radar signatures RS and the initial points AP; and transferring geo-referencing of the supplied geo-referenced SAR image data to the supplied aerial image data registered with the supplied geo-referenced SAR image data.

2. The method according to claim 1, wherein the supplied aerial image data already comprises at least a rough geo-referencing with a geo-referencing accuracy $G_L$ [m], and the supplied geo-referenced SAR image data comprises a geo-referencing accuracy $G_{SAR}$ [m], wherein: $G_{SAR}$ [m]<$G_L$ [m].

3. The method according to claim 1, wherein the point-like radar signatures are of image radar objects extending vertically from the earth's surface.

4. The method according to claim 1, wherein the supplied geo-referenced SAR image data has a geo-referencing accuracy $G_{SAR}$ that is one of ≤0.5 m, ≤5 cm, ≤10 cm, ≤20 cm, ≤30 cm, or ≤40 cm.

5. The method according to claim 1, wherein the supplied aerial image data is geo-referenced and has a geo-referencing accuracy $G_{aerial}$ that is one of ≤150 m, ≤100 m, ≤50 m, ≤20 m, or ≤10 m.

6. The method according to claim 1, wherein in the supplied geo-referenced SAR image data only those point-like radar signatures are determined for which no other radar signatures are present in an image data periphery with a given radius R about a center of a respective radar signature.

7. The method according to claim 6, wherein the radius R is chosen depending on geo-referencing accuracy $G_{aerial}$ of the supplied aerial image data: R=R(GL).

8. A device to geo-reference supplied aerial image data, which has been recorded by an optical imaging system and in which a part of the earth's surface is imaged, wherein geo-referencing of the aerial image data is carried out based on supplied geo-referenced synthetic aperture radar (SAR) image data, in which the same part of the earth's surface is imaged, the device comprising:

a processing device; and a memory storing instructions that, when executed by the processing device, cause the processing device to perform operations comprising:

determining point-like radar signatures RS in the geo-referenced SAR image data;

providing a position of the sun for a recording time of the supplied aerial image data and for the part of the earth's surface imaged therein;

determining elongated cast shadows SS produced in a direction of solar radiation in the supplied aerial image data based on the position of the sun at the time as recorded;

determining, in the supplied aerial image data, initial points AP facing the sun of the determined elongated cast shadows SS;

determining spatially corresponding point-like radar signatures RS and initial points AP of the elongated cast shadows SS;

registering the supplied aerial image data with the supplied geo-referenced SAR image data based on the spatially corresponding point-like radar signatures RS and the initial points AP; and transferring geo-referencing of the supplied geo-referenced SAR image data to the supplied aerial image data registered with the supplied geo-referenced SAR image data.

9. A method of geo-referencing supplied aerial image data, which has been recorded by an optical imaging system and in which a part of the earth's surface is imaged, wherein the geo-referencing of the supplied aerial image data is carried out based on supplied geo-referenced synthetic aperture radar (SAR) image data, in which the same part of the earth's surface is imaged, the method comprising:

determining point-like radar signatures RS in the geo-referenced SAR image data;

providing a position of the sun for recording a time of the supplied aerial image data and the part of the earth's surface imaged therein;

based on a given imaging geometry of the optical imaging system and a supplied position of the imaging system during recording of the supplied aerial image data, determining elongated projection images PB of elongated objects rising vertically above the earth's surface in the supplied aerial image data;

determining elongated cast shadows SS produced in a direction of solar radiation in the supplied aerial image data based on the position of the sun at the time as recorded;

determining intersecting points SP of spatially corresponding cast shadows SS and projection images PB and/or their respective prolongations each time in a longitudinal direction;

determining spatially corresponding point-like radar signatures RS and the intersecting points SP;

registering the supplied aerial image data with the supplied geo-referenced SAR image data based on the spatially corresponding point-like radar signatures RS and the intersecting points SP; and transferring geo-referencing of the supplied geo-referenced SAR image data to the supplied aerial image data registered with the supplied geo-referenced SAR image data.

10. The method according to claim 9, wherein the supplied aerial image data already comprises at least a rough geo-referencing with a geo-referencing accuracy $G_L$ [m], and the supplied geo-referenced SAR image data comprises a geo-referencing accuracy $G_{SAR}$ [m], wherein: $G_{SAR}$ [m]<$G_L$ [m].

11. The method according to claim 9, wherein the point-like radar signatures are of image radar objects extending vertically from the earth's surface.

12. The method according to claim 9, wherein the supplied geo-referenced SAR image data has a geo-referencing accuracy $G_{SAR}$ that is one of ≤0.5 m, ≤5 cm, ≤10 cm, ≤20 cm, ≤30 cm, or ≤40 cm.

13. The method according to claim 9, wherein the supplied aerial image data is geo-referenced and has a geo-referencing accuracy $G_{aerial}$ that is one of ≤150 m, ≤100 m, ≤50 m, ≤20 m, or ≤10 m.

14. The method according to claim 9, wherein in the SAR image data only those point-like radar signatures are determined for which no other radar signatures are present in an image data periphery with a given radius R about a center of a respective radar signature.

15. The method according to claim 14, wherein the radius R is chosen depending on geo-referencing accuracy $G_{aerial}$ of the supplied aerial image data: $R=R(G_L)$.

16. A device to geo-reference supplied aerial image data, which has been recorded by an optical imaging system and in which a part of the earth's surface is imaged, wherein geo-referencing of the supplied aerial image data is carried out based on supplied geo-referenced synthetic aperture radar (SAR) image data, in which the same part of the earth's surface is imaged, the device comprising:
  a processing device; and
  a memory storing instructions that, when executed by the processing device, cause the processing device to perform operations comprising:
    determining point-like radar signatures RS in the supplied geo-referenced SAR image data;
    providing a position of the sun for a recording time of the supplied aerial image data and for the part of the earth's surface imaged therein;
    determining elongated cast shadows SS produced in a direction of solar radiation in the supplied aerial image data based on the position of the sun at the time as recorded;
    determining elongated projection images PB of elongated objects rising vertically above the earth's surface in the supplied aerial image data based on a given imaging geometry of the optical imaging system and a supplied position of the optical imaging system during the recording of the supplied aerial image data;
    determining intersecting points SP of spatially corresponding cast shadows SS and projection images PB and/or their respective prolongations each time in a longitudinal direction;
    determining spatially corresponding point-like radar signatures RS and intersecting points SP;
    registering the supplied aerial image data with the supplied geo-referenced SAR image data based on the spatially corresponding point-like radar signatures RS and the intersecting points SP; and
    transferring the geo-referencing of the supplied geo-referenced SAR image data to the supplied aerial image data registered with the supplied geo-referenced SAR image data.

* * * * *